US006929544B2

(12) United States Patent
Osterer

(10) Patent No.: US 6,929,544 B2
(45) Date of Patent: Aug. 16, 2005

(54) INTERNET GAMING SYSTEM

(76) Inventor: Michael Osterer, Crawford St., Harrison, NY (US) 10528

( * ) Notice: Subject to any disclaimer, the term of this patent is extended or adjusted under 35 U.S.C. 154(b) by 0 days.

(21) Appl. No.: 09/747,100

(22) Filed: Dec. 21, 2000

(65) Prior Publication Data

US 2002/0082085 A1 Jun. 27, 2002

(51) Int. Cl.[7] ............................................... A63F 13/00
(52) U.S. Cl. ........................................ 463/17; 463/42
(58) Field of Search ........................... 463/16, 17, 25, 463/40, 41, 42, 29

(56) References Cited

U.S. PATENT DOCUMENTS

| | | | | |
|---|---|---|---|---|
| 5,722,890 A | * | 3/1998 | Libby et al. .................. | 463/16 |
| 5,779,549 A | * | 7/1998 | Walker et al. ................ | 463/42 |
| 5,921,865 A | | 7/1999 | Scagnelli et al. | |
| 5,987,101 A | | 11/1999 | Rathore et al. | |
| 6,004,206 A | | 12/1999 | Fabri | |
| 6,011,835 A | | 1/2000 | Rathore et al. | |
| 6,012,984 A | | 1/2000 | Roseman ..................... | 463/42 |
| 6,016,338 A | | 1/2000 | Bansal et al. | |
| 6,019,374 A | | 2/2000 | Breeding | |
| 6,024,640 A | | 2/2000 | Walker et al. | |
| 6,024,641 A | * | 2/2000 | Sarno .......................... | 463/17 |
| 6,061,716 A | | 5/2000 | Moncreiff | |
| 6,077,162 A | | 6/2000 | Weiss .......................... | 463/26 |
| 6,146,272 A | * | 11/2000 | Walker et al. ............ | 273/138.1 |
| 6,179,713 B1 | * | 1/2001 | James et al. .................. | 463/1 |
| 6,206,782 B1 | * | 3/2001 | Walker et al. ................ | 463/20 |
| 6,277,026 B1 | * | 8/2001 | Archer ......................... | 463/17 |
| 6,322,446 B1 | * | 11/2001 | Yacenda ...................... | 463/16 |
| 6,352,479 B1 | * | 3/2002 | Sparks, II .................... | 463/42 |
| 6,368,218 B2 | * | 4/2002 | Angell, Jr. .................. | 273/139 |
| 6,383,078 B1 | * | 5/2002 | Yacenda ...................... | 463/40 |

FOREIGN PATENT DOCUMENTS

| | | |
|---|---|---|
| GB | 2 347 332 B1 | 8/2000 |
| WO | WO-00/61251 A1 | 10/2000 |

OTHER PUBLICATIONS

Supplemental European Search Report.

* cited by examiner

Primary Examiner—Kim Nguyen
(74) Attorney, Agent, or Firm—Darby & Darby

(57) ABSTRACT

A gaming system and method is provided for purchasing lottery tickets and tracking the results therefor over the Internet. End users can purchase lottery tickets of different states online. The lottery tickets are electronically tracked (win or lose) whose results are forwarded to the purchasers via the Internet, e.g., by electronic mail (e-mail) or posting the results on a designated website. Virtual groups (in the form of chat rooms) are formed online. Members of the virtual groups can access the chat rooms using an Internet service provider to purchase lottery tickets and check the results.

20 Claims, 5 Drawing Sheets

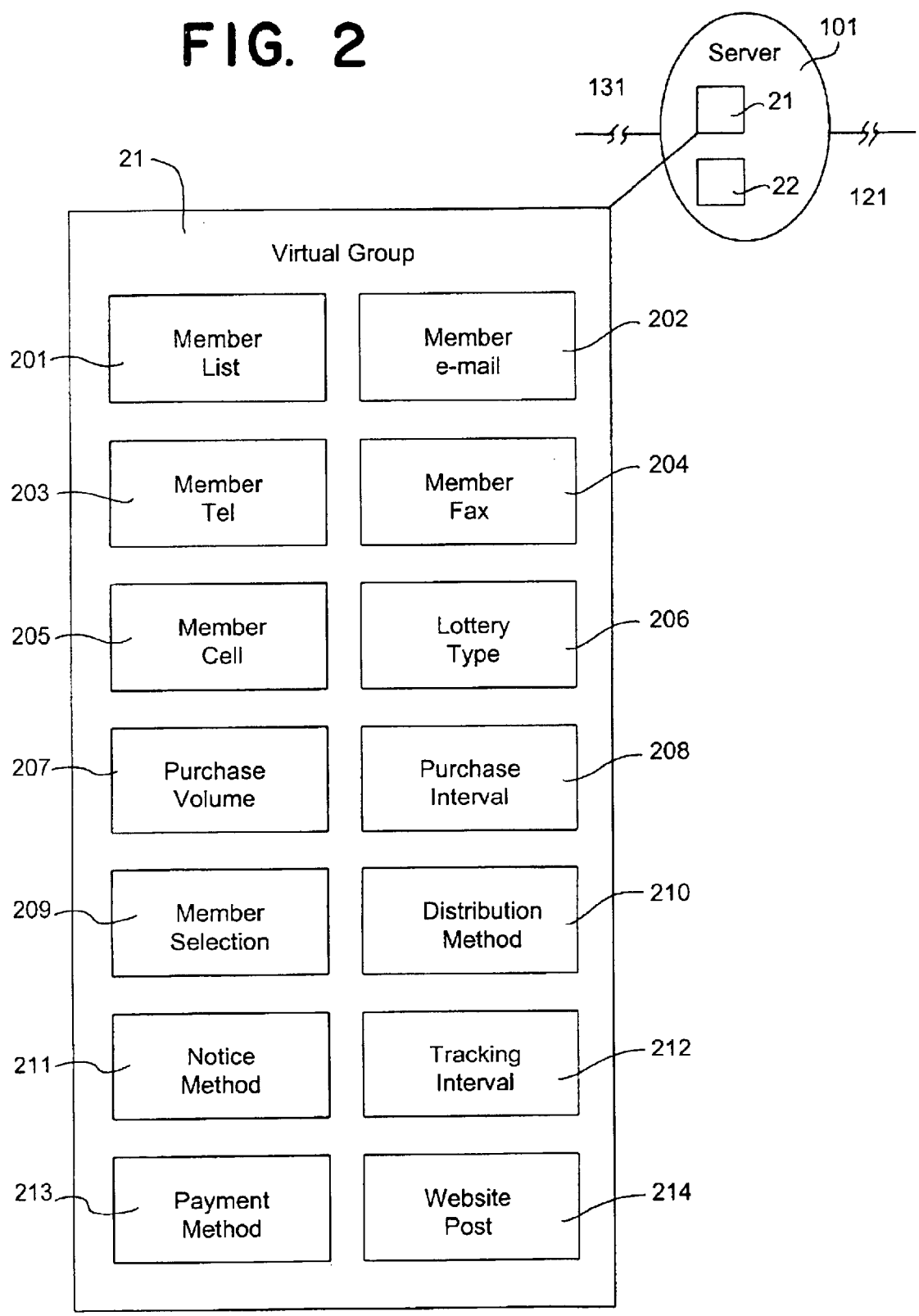

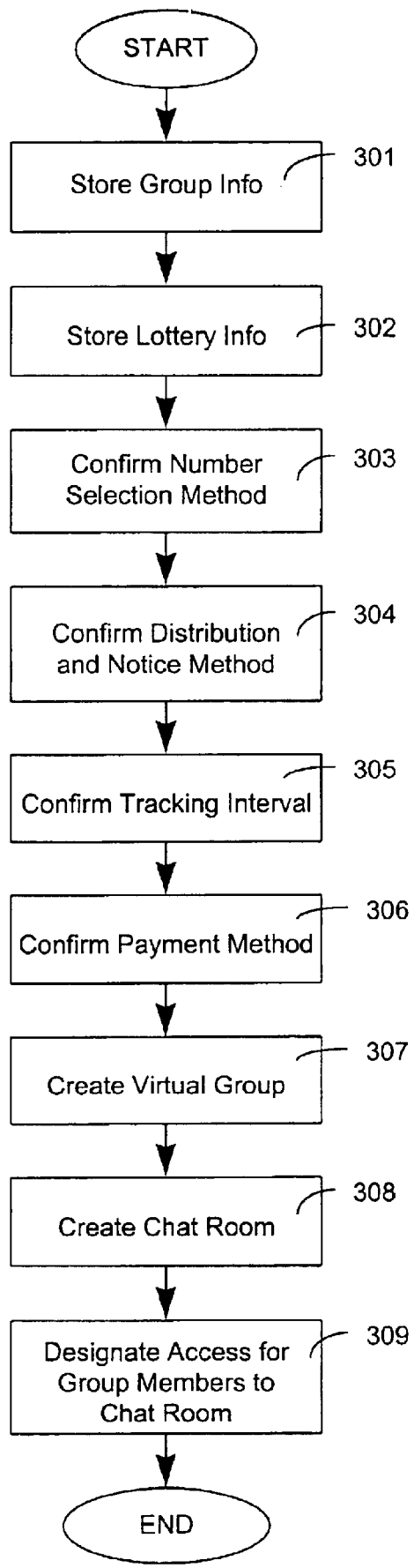

INTERNET GAMING SYSTEM

FIELD OF THE INVENTION

The invention relates to an Internet gaming system and a method associated therewith and, more particularly, a gaming system and method for purchasing lottery tickets and tracking the results therefor over the Internet.

BACKGROUND OF THE INVENTION

There are many ways of purchasing lottery tickets and tracking the results. A purchaser can buy a lottery ticket from a vendor in a local market and track the results by watching television or listening to the radio upon or after announcement of the winning results. Purchasers often form a group for procuring a large number of tickets in order to increase the probability of winning the lottery. If a group of purchasers desire to purchase a number of tickets, they may designate a single purchaser who buys the tickets from a vendor and tracks the results for the whole group. Upon learning the results, the designated purchaser informs each individual in the group of the results. This process is repeated for every bulk purchase for the group, e.g., as often as the group desires or on a periodic basis.

This conventional method of purchasing lottery tickets for a group of purchasers becomes unduly burdensome as the size of the group increases, or if the members of the group are located in distant geographical locations. Furthermore, purchasing becomes logistically cumbersome as the group desires to purchase lottery tickets from various states or foreign jurisdictions. Therefore, a need exists in the art for an improved lottery purchasing system and method with result tracking capability for a plurality of purchasers.

SUMMARY OF THE INVENTION

The invention relates to a gaming system and method for purchasing lottery tickets and tracking the results therefor over the Internet. End users can purchase lottery tickets of different states online. The lottery tickets are electronically tracked (win or lose) and the results are forwarded to the purchasers via the Internet, e.g., by electronic mail (e-mail) or posting the results on a designated website.

In a preferred embodiment, the invention provides a system for purchasing lottery tickets over the Internet comprising at least one server and at least one computer connected to the at least one server via the Internet. The at least one server hosts at least one virtual group of lottery ticket purchasers, and stores group information for the at least one virtual group. The at least one server also stores lottery information about at least one lottery. The at least one server causes the lottery tickets to be purchased for the purchasers according to the group information and the lottery information. The at least one server then communicates the results of the purchases of lottery tickets to the purchasers on the basis of the group information.

In another embodiment, the invention provides a method for purchasing lottery tickets over the Internet in a system including at least one server and at least one computer, where the at least one server stores group information concerning a virtual group of purchasers of lottery tickets, and lottery information on at least one lottery. The method according to the embodiment comprises the steps of (a) electronically purchasing the lottery tickets according to the group information and the lottery information; (b) communicating results of the lottery ticket purchases to the purchasers using the group information; and (c) repeating steps (a) and (b) according to the group information and the lottery information, unless any of the group information and the lottery information is caused to be changed.

In a further preferred embodiment virtual groups (in the form of chat rooms) are formed online. Members of the virtual groups can access the chat rooms using an Internet service provider to purchase lottery tickets and check the results.

BRIEF DESCRIPTION OF THE DRAWINGS

The foregoing and other advantages and features of the invention will become more apparent from the detailed description of the preferred embodiments of the invention given below with reference to the accompanying drawings in which:

FIG. 2 is a diagram illustrating an exemplary virtual group for purchasing lottery tickets according to the invention;

FIG. 3 is a flow diagram illustrating the setup of an exemplary virtual group for purchasing lottery tickets according to the invention.

DETAILED DESCRIPTION OF THE PREFERRED EMBODIMENTS

Figure 1:
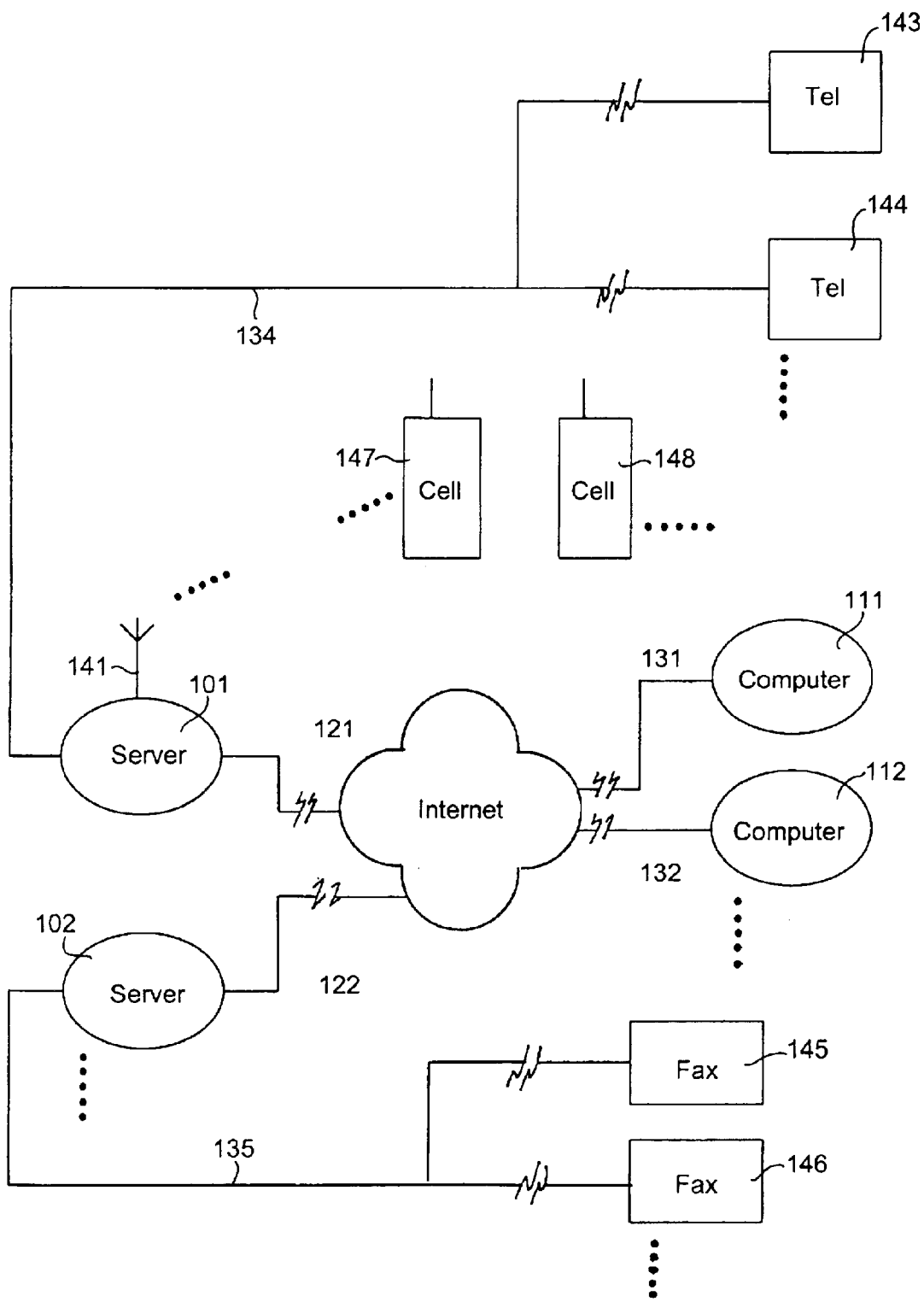
FIG. 1 is a block diagram generally illustrating an Internet gaming system according to the invention.

FIG. 1 is a diagram that illustrates an Internet gaming system according to the invention in general. The system according to the invention comprises at least one server (e.g., servers 101, 102 . . . ) and at least one computer (e.g., computers 111, 112 . . . ) connected to the at least one server over the Internet, e.g., using an Internet service provider such as America Online™ (AOL™) or Prodigy™. An Internet service provider or ISP is a service, commercial or otherwise, that provides access to the Internet for end users. The servers 101, 102 . . . are connected to the Internet via connections (e.g., connections 121, 122 . . . ) respectively) such as a modem line, a T1 line or any variant of digital subscriber line (DSL) including ADSL (advanced digital subscriber line). The computers 111, 112 . . . are connected to the Internet via connections (e.g., connections 131, 132 . . . , respectively) such as a modem line, a T1 line or any variant of digital subscriber line (DSL) including ADSL (advanced digital subscriber line). Purchasers of lottery tickets, as end users at one of the computers can access a server over the Internet using the service provided by the ISP.

The servers (101, 102 . . . ) can send information to the purchasers of lottery tickets by communicating with the computers (111, 112 . . . ) over the Internet (e.g., via connections 121, 122 . . . and 131, 132 . . . , respectively), the at least one telephone (e.g., tel 143, 144 . . . ) over landline 134, the at least one fax (e.g., fax 145, 146 . . . ) over landline 135, or the at least one cellular telephone (e.g., 147, 148 . . . ) over the airwaves or via satellite by using transmitter 141 provided therefor. If a group of purchasers desires to purchase lottery tickets in bulk, a virtual group is created therefor at a server which includes corresponding information with respect to the group of purchasers (group information) and the purchasing of the lottery tickets (lottery information).

FIG. 2 is a diagram that illustrates an exemplary virtual group for purchasing lottery tickets for a group of purchasers according to the invention. In a database or archive at a server (e.g., server 101 shown in FIG. 2), information is stored for an exemplary virtual group 21 corresponding to the group information and the lottery information with respect to the purchasers. The storage device can be any storage device such as a hard disk, a floppy drive, a tape drive, a CD-ROM (compact disc, read only memory), a CD-RW (compact disc read or write memory) or a non-volatile memory. The information includes e.g., the member list 201 which includes biographical information about each of the purchasers in the group and the member e-mail 202, which includes electronic mail (e-mail) addresses for the purchasers (if any). Other information includes the member tel 203, which includes the telephone numbers for the purchasers (if any); the member fax 204, which includes the fax numbers for the purchasers (if any); the member cell 205, which includes the cellular telephone numbers for the purchaser (if any); and the lottery type 206, which includes the types of lottery tickets the purchasers desire to procure (e.g., the state lottery of any of the 50 states in the U.S. or the provinces of Canada, the lottery sponsored by any U.S. territory such as Puerto Rico or the U.S. Virgin Islands). Additional information includes the purchase volume 207, which includes the number of lottery tickets the purchasers desire to procure; the purchase interval 208, which includes the frequency of the lottery ticket purchases; the number selection 209, which includes the manner and method for selecting entry numbers for the lottery tickets (e.g., computer-generated or arbitrary number selection); the distribution method 210, which includes the manner of delivering the lottery tickets to the purchasers (if needed); the notice method 211, which includes the method of notifying the purchasers of the results of the lottery ticket drawings; the tracking interval 212 which includes the frequency of monitoring or tracking the results of the lottery ticket drawings; the payment method 213, which includes the method of payment designated by the purchasers for the purchasing of the lottery tickets (e.g., credit cards or wire transfer); and the website post 214, which includes the manner of displaying the results for viewing by the purchasers, e.g., by posting the results at a website designated by the purchasers, or at a chat room created for the virtual group 21 which is accessible by the purchasers. A chat room is a service provided by Internet service providers where designated members of the chat room can discuss matters of interest to them (e.g., the lottery tickets) over the Internet.

FIG. 3 is a flow diagram that illustrates the setup of an exemplary virtual group 21 created at the server 101 for purchasing lottery tickets for a group of people according to the invention. To create the virtual group 21, group information for the purchasers is stored in the server 101 in step 301. The group information comprises, e.g., the member list 201, which includes biographical information for each of the purchasers in the group; the member e-mail 202, which includes electronic mail (e-mail) addresses for the purchasers (if any); the member tel 203, which includes the telephone numbers for the purchasers (if any); the member fax 204, which includes the fax numbers for the purchasers (if any); and the member cell 205, which includes the cellular telephone numbers for the purchaser (if any). In step 302, the lottery information with respect to the lottery tickets the purchasers desire to procure is stored in the server 101. The lottery information comprises, e.g., the lottery type 206, which includes the types of lottery tickets the purchasers desire to procure (e.g., the state lottery of any of the 50 states in the U.S. or the provinces of Canada, the lottery sponsored by any U.S. territory, such as Puerto Rico or the U.S. Virgin Islands); the purchase volume 207, which includes the number of lottery tickets the purchasers desire to procure; and the purchase interval 208, which includes the frequency of the lottery ticket purchases. In step 303, the number selection 209, which includes the manner and method for selecting entry numbers for the lottery tickets, is stored in the server 101 and confirmed. The number selection can include computer-generated random numbers at the server 101, arbitrary number selection per the purchasers' entry, random number selection from a fixed pool of numbers provided by the purchasers, number generation according to a predetermined number selection algorithm provided at the server 101 or selected by the purchasers, etc. In step 304, the distribution method 210, which includes the manner of delivering the lottery tickets to the purchasers (if needed); and the notice method 211, which includes the method of notifying the purchasers of the results of the lottery ticket drawings, are stored in the server 101 and confirmed. In step 305, the tracking interval 212, which includes the frequency of monitoring or tracking the results of the lottery ticket drawings, is stored in the server 101 and confirmed. In step 306, the payment method 213, which includes the method of payment designated by the purchasers, is stored in the server 101 and confirmed. The payment method can include credit cards, personal checks, wire transfer, automated payment and replenishment services such as EZPass™, online payment services such as PayPal™ or eBillPay™, etc. In step 307, the virtual group 21 is created at the server 101 according to the information gathered for storage in steps 301, 302, 303, 304, 305 and 306 which correspond to the group of purchasers of lottery tickets. In step 308, a chat room corresponding to the virtual group 21 is created at the server 101. Access to the chat room created for the virtual group 21 is provided for all of the purchasers (step 309), but access may be limited to the purchasers, e.g. by means of passwords.

Figure 4A:
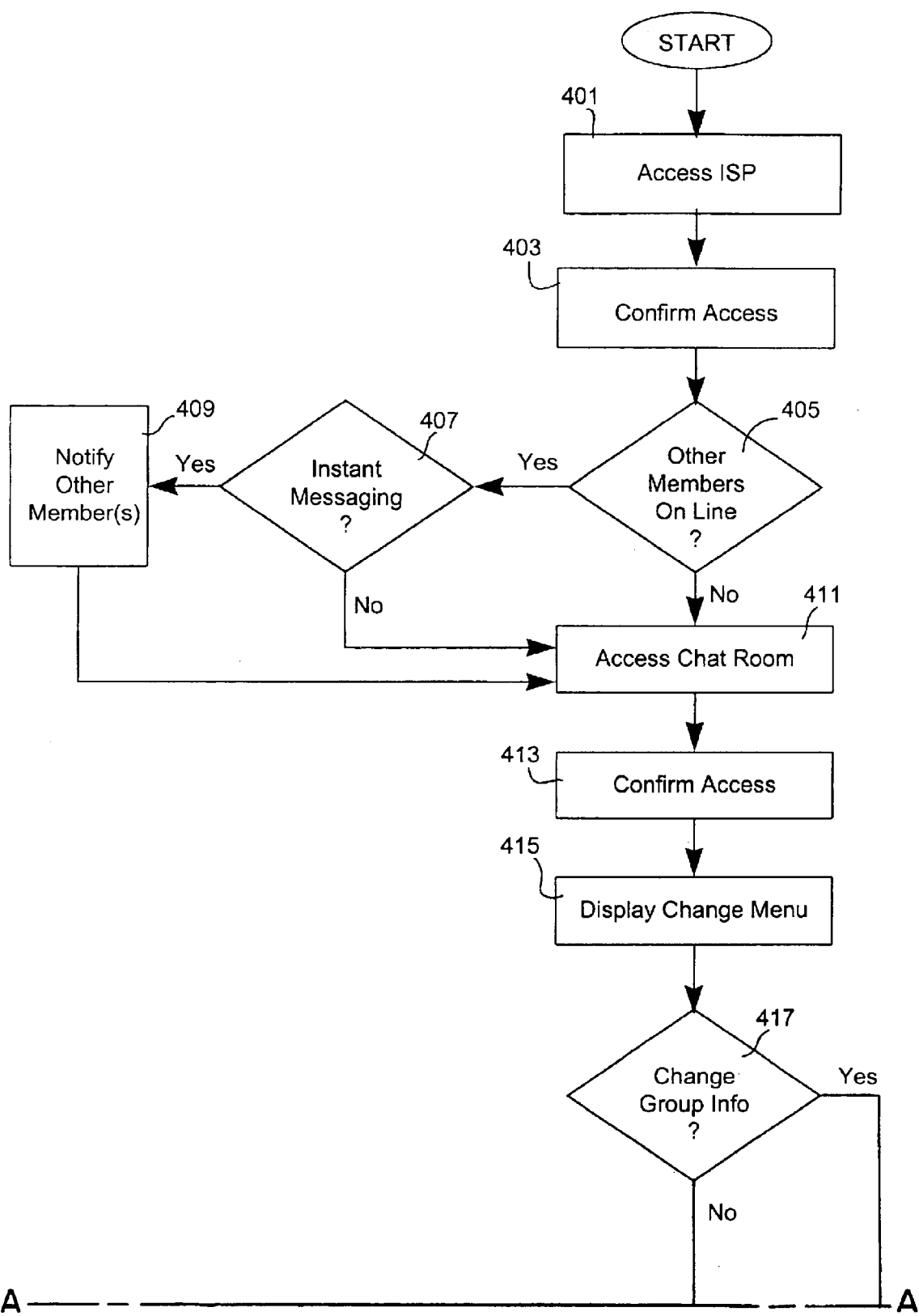
FIGS. 4A and 4B are a flow diagram illustrating an exemplary operation of a chat room for a group of lottery purchasers according to the invention.
Figure 4B:
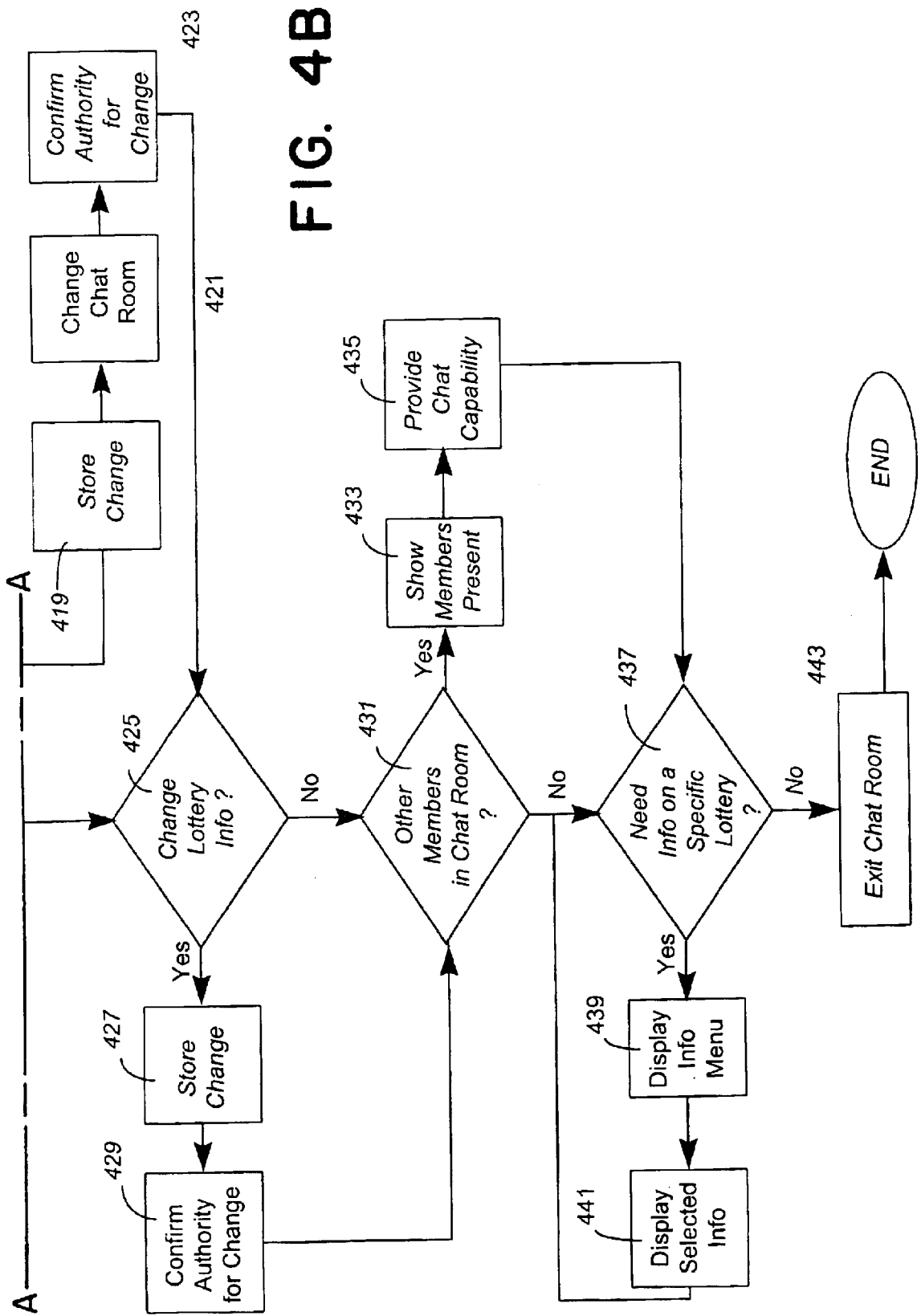

FIGS. 4A and 4B are a flow diagram illustrating an exemplary operation of a chat room for a group of lottery purchasers according to the invention. The chat room created for the exemplary virtual group 21 is provided by an ISP such as America Online™ (AOL™) or Prodigy™. The ISP is accessed (step 401 of FIG. 4A) and the access is authorized and confirmed (step 403), e.g., by entering a valid password at the computer 111. This password is communicated to the server 101 over the Internet. In step 405, it is determined whether any of the other purchasers, i.e., other members belonging to the virtual group 21, is online, i.e., connected to the at least one server provided by the ISP via the Internet. If not, the control flow passes to step 411, i.e. the chat room is accessed. If any one of the other purchasers is online, the control flow is directed to step 407 where it is determined whether the instant messaging service (such as Instant Messenger™) has been requested. If so, all of the other purchasers who are online at the time are notified by the instant messaging service that a new purchaser has logged on (step 409). If the instant messaging service is not requested in step 407, then the control flow is directed to step 411 where the chat room is accessed.

Once the chat room is accessed in step 411, the access is confirmed (step 413), e.g., by entering a valid password at the computer 111 which is in communication with the server 101 over the Internet. A change menu for changing the group information or the lottery information is then displayed (step 415). In step 417, it is determined whether a change in any of the group information is requested. The group information comprise, e.g., the member list 201, which includes biographical information for each of the purchasers in the group; the member e-mail 202, which includes electronic mail (e-mail) addresses for the purchasers (if any); the member tel 203, which includes the telephone numbers for the purchasers (if any); the member fax 204, which includes the fax numbers for the purchasers (if any); and the member cell 205, which includes the cellular telephone numbers for the purchaser (if any). If no change is requested in step 417, the control flow passes to step 425. If change is requested in step 417, that change is stored in the server 101 (step 419). Any changes effecting the chat room stored and implemented as well (step 421 ). Once the change is authorized and authenticated in step 423, the control flow is directed to step 425 (FIG. 4B).

As shown in FIG. 4B, in step 425 it is determined whether in any of the lottery information is being requested. The lottery information comprises, e.g., the lottery type 206, which includes the types of lottery tickets the purchasers desire to procure (e.g., the state lottery of any of the 50 states in the U.S. or the provinces of Canada, the lottery sponsored by any U.S. territory such as Puerto Rico or the U.S. Virgin Islands); the purchase volume 207, which includes the number of lottery tickets the purchasers desire to procure; the purchase interval 208, which includes the frequency of the lottery ticket purchases; the number selection 209 which includes the manner and method for selecting entry numbers for the lottery tickets (e.g., computer-generated or arbitrary number selection); the distribution method 210, which includes the manner of delivering the lottery tickets to the purchasers (if needed); the notice method 211, which includes the method of notifying the purchasers of the results of the lottery ticket drawings; the tracking interval 212, which includes the frequency of monitoring or tracking the results of the lottery ticket drawings; the payment method 213, which includes the method of payment designated by the purchasers for the purchasing of the lottery tickets (e.g., credit cards or wire transfer); and the website post 214, which includes the manner of displaying the results for viewing by the purchasers. If change is not requested in step 425, the control flow passes to step 431. If change is requested in step 425, that change is stored in the server 101 (step 427). Once the change is authorized and authenticated in step 429, the control flow is directed to step 431.

In step 431, it is determined whether any of the other purchasers, i.e., other members belonging to the virtual group 21, is present at this time, i.e., accessing the same chat room by connecting to the server provided by the ISP via the Internet. If no other purchaser belonging to the virtual group is accessing the chat room at the time, the control flow passes to step 437. If any of the other purchasers is accessing the chat room at the time, their names are shown or displayed (step 433) and chat capability (such as the Instant Messaging service) is provided therefor, so that the purchasers accessing the chat room can discuss the lottery tickets with each other. The control flow is then directed to step 437.

In step 437, it is determined whether information is requested for a specific lottery. If not, the chat room access is concluded (step 443). If information is requested for a specific lottery, an information menu is displayed for that lottery in step 439. The information menu can include selections such as lottery history, winning probability, demographic information, etc. The selected information is displayed in step 441. The control flow then passes to step 437. If no other information is then requested for a specific lottery, the chat room access is concluded (step 443).

Although the invention has been particularly shown and described in detail with reference to the preferred embodiments thereof, the embodiments are not intended to be exhaustive or to limit the invention to the precise forms disclosed herein. It will be understood by those skilled in the art that many modifications in form and detail may be made therein without departing from the spirit and scope of the invention. Similarly, any process steps described herein may be interchangeable with other steps to achieve substantially the same result. All such modifications are intended to be encompassed within the scope of the invention, which is defined by the following claims and their equivalents.

I claim:

1. A system for permitting purchasers to purchase lottery tickets over the Internet comprising:

at least one server; and at least one remote computer connected to the at least one server via the Internet,—the purchasers entering predefined information into said server via said computer, said predefined information including biographical information about the purchasers, information about at least one lottery whose tickets the purchasers wish to buy, and information about the purchasers' desires to enter a group;

wherein said at least one server forms at least one virtual group of lottery ticket purchasers based on the predefined information entered by the purchasers, which sets the purchasers for the group, the at least one server storing group information for the at least one virtual group which includes entered choices from the predefined information;

wherein the at least one server stores lottery information about at least one lottery;

wherein the at least one server causes the lottery tickets to be purchased for the virtual group of purchasers according to the group information and the lottery information; and wherein the at least one server communicates results of the purchase of lottery tickets to the purchasers on the basis of the group information.

2. The system of claim 1 wherein the group information comprises biographical information of the purchasers and one or more of the number of purchasers, telephone numbers, fax numbers, cellular telephone numbers and e-mail addresses of the purchasers.

3. The system of claim 1 wherein the lottery information comprises one or more of the lottery type, purchase volume, purchase interval, lottery number selection, tracking interval, payment method, distribution and notification method for the virtual group.

4. The system of claim 1 further comprising a chat room created for the virtual group wherein the purchasers discuss the lottery tickets with each other over the Internet.

5. The system of claim 1 wherein the group information is changed by accessing the at least one server via the Internet.

6. The system of claim 1 wherein the lottery information is changed by accessing the at least one server via the Internet.

7. The system of claim 1 wherein the chat room comprises an information menu for the purchasers to select for displaying information on one of the lottery tickets.

8. A method for allowing purchasers to purchase lottery tickets over the Internet in a system including at least one server and at least one computer connected to the server via the Internet, said server storing information on at least one lottery, comprising the steps of:

(a) receiving predefined information at the server over the Internet from purchasers at the computer, the predefined information including biographical information about the purchasers, information about at least one lottery whose tickets the purchasers wishes to buy, and information about the purchasers' desire to enter a group, (b) causing the at least one server to store the predefined information, to form, a virtual group of purchasers of lottery tickets based on the predefined information, and to store group information, (c) causing the server to electronically purchase the lottery tickets for the virtual group of purchasers according to the group information and the lottery information; and (d) causing the server to communicate results of the lottery ticket purchases to the purchasers using the group information.

9. The method of claim 8 wherein the group information includes biographical information of the purchasers and one or more of the purchaser's telephone numbers, fax numbers, cellular telephone numbers, and e-mail addresses.

10. The method of claim 8 wherein the lottery information includes one or more of the lottery type, purchase volume, purchase interval, lottery number selection, tracking interval, payment method, distribution and notification method for the virtual group.

11. The method of claim 8 further comprising the step of creating a chat room for the virtual group where the purchasers discuss the lottery tickets with each other over the Internet.

12. The method of claim 11 further comprising the steps of:

(e) determining whether any of the purchasers is online over the Internet;

(f) providing instant messaging if any of the purchasers is online; and (g) permitting the purchasers to access the chat room.

13. The method of claim 12 further comprising the step of authenticating access in step (g).

14. The method of claim 11 further comprising the steps of:

(h) determining whether a change has been requested for the group information;

(i) causing the group information to be changed, if a change has been requested in step (h);

(j) determining whether a change has been requested for the lottery information; and (k) causing the lottery information to be changed, if a change has been requested in step (j).

15. The method of claim 14 further comprising the step of authenticating change in steps (h) and (j).

16. The method of claim 8 further comprising the steps of selecting one of the lottery tickets and displaying information corresponding to the selected lottery ticket.

17. The method of claim 8 wherein the step of communicating results communicates information on the purchases and information on whether any of the purchases resulted in a winning ticket.

18. The method of claim 8 wherein the step of communicating is by one of electronic mail or posting results on an Internet website.

19. The method of claim 8 further including the steps of repeating steps (c) and (d) according to the group information and the lottery information, unless any of the group information and the lottery information is changed.

20. The method of claim 8 further including the step of permitting the purchaser to track the results of the selected lottery over the Internet.

* * * * *